United States Patent [19]

Kreuzer

[11] Patent Number: 5,655,789
[45] Date of Patent: Aug. 12, 1997

[54] GAS BAG COLLISION SAFETY SYSTEM

[75] Inventor: Martin Kreuzer, Kleinwallstadt, Germany

[73] Assignee: MST Automotive GmbH, Aschaffenburg, Germany

[21] Appl. No.: 615,759

[22] Filed: Mar. 13, 1996

[30] Foreign Application Priority Data

Mar. 14, 1995 [DE] Germany ................. 195 09 165.5

[51] Int. Cl.⁶ ............... B60R 21/20; B60R 21/26; B60R 21/05; B62D 1/11
[52] U.S. Cl. ........................................................ 280/731
[58] Field of Search ............................................ 280/731

[56] References Cited

U.S. PATENT DOCUMENTS 3,799,576 3/1974 Fiala ......................... 280/731
5,398,963 3/1995 Föhl ......................... 280/731
5,553,888 9/1996 Turner et al. ............... 280/731
5,570,901 11/1996 Furainer .................. 280/730.1

FOREIGN PATENT DOCUMENTS 615889 9/1994 European Pat. Off. .
684167 11/1995 European Pat. Off. .

Primary Examiner—Kenneth R. Rice
Attorney, Agent, or Firm—Sprung Horn Kramer & Woods

[57] ABSTRACT

In a gas bag collision safety system for the steering wheel of street vehicles, the bowl-shaped steering wheel, into which a gas bag is folded, is fastened to the hub of the steering wheel, and the marginal area defining the gas inlet of the gas bag is joined gas-tight to the steering wheel hub. An improvement in installation accuracy is brought about by the fact that the gas inlet opening of the gas bag is made concentric with a through-bore made in the steering wheel hub and the gas generator is contained in the steering spindle.

6 Claims, 1 Drawing Sheet

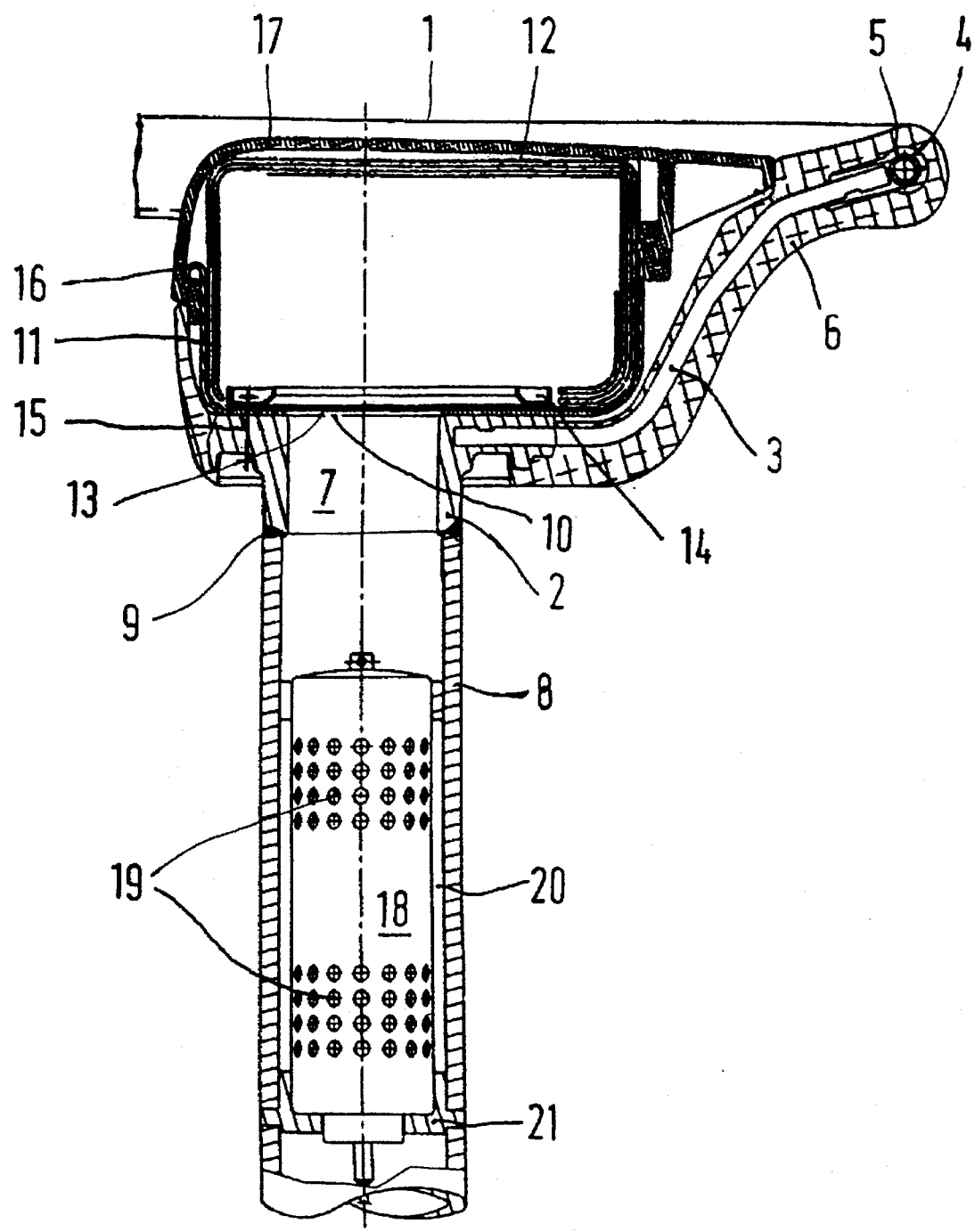

GAS BAG COLLISION SAFETY SYSTEM

The invention relates to a gas bag collision safety system for the steering wheel of street vehicles, especially passenger automobiles, consisting of a tubular steering spindle connected to the steering gear, and the bowl-shaped steering wheel keyed or affixed to the spindle, with a folded gas bag integrated between the steering wheel ring and the steering wheel hub, while the marginal zone around the gas inlet is joined in a gas-tight manner to the steering wheel hub.

The requirement that the severity of injury to persons riding in street vehicles, especially passenger cars, due to accidents, be kept as low as possible by providing safety measures, is being met especially by the gas bag protective unit integrated in the steering wheel of the vehicle, and in some cases by a gas bag unit installed on the passenger side behind the dashboard. A gas bag protective unit of this kind consists essentially of a gas generator, a generator support bearing the latter, and a gas bag folded on or around the gas generator. The generator support furthermore has the purpose of accommodating the flange plate for mounting the gas bag within the marginal area around the gas port. A clip strip disposed around the generator support holds the cover of the gas bag, consisting generally of polyurethane integral foam or a thermoplastic elastomer. In the event of a collision against a massive obstruction, acceleration detectors housed in the front part and/or in the passenger compartment respond, and after a few milliseconds the gas bag begins to inflate, as the ignition current is switched to the igniter of the gas generator, which in turn ignites the primer and thus the explosive charge, so that after 40 to 50 ms the upper torso of the occupant strikes against the fully inflated gas bag, and he thus immediately shares in the vehicle's deceleration, while a tolerable, uniform acceleration acts during the delay time (DE-B-2 347 255). The arrangement of a gas bag safety unit of this kind not only occupies a considerable part of the cross section of the steering wheel, but also the mass of the gas generator leads to undesirable vibration creating the need for extensive vibration damping measures.

Provision is therefore made in DE-A-2 137 833 for a gas bag safety apparatus for motor vehicles with a gas bag folded in a bowl-shaped steering wheel, in which the marginal area of the gas port of the bag is screwed onto the hub and the gas bag is connected to a passage of circular cross section running between the steering wheel spindle and a jacket surrounding the latter. A gas generator is fastened to the outside of the tube, and its gas discharge opening leads into the circular passage. In case of collision with a massive obstruction, the firing charge of the gas generator is ignited and the gas that forms flows through a corresponding opening in the tube into the passage and from there into the gas bag. It is a disadvantage, however, that the gas generator mounted outside of the tube requires considerable sealing so as to assure a reliable discharge of the gas into the circular passage. In addition, the tube itself must be sealed.

The present invention is addressed to the problem of designing the above-described gas bag safety system such that a number of easily manufactured components will improve ease of installation, and complex measures for sealing the gas generator against the steering spindle can be dispensed with.

The solution of this problem consists in the features described in claim 1.

In the subordinate claims advantageous embodiments of the invention in accordance with the features of claim 1 are set forth.

The advantages achieved with the gas bag safety system according to the invention are to be seen especially in the fact that the gas generator is mounted directly adjacent the gas port of the air bag and thus rebound effects due to the air column present in the steering spindle are prevented. Since the gas generator is not integrated into the gas bag safety unit, the bulk of the latter can be considerably reduced.

The invention is described in the drawing by way of example, in connection with a longitudinal section including the axis of the steering spindle.

The steering wheel 1 consists of the steering wheel hub 2 made of pressure-cast aluminum, integrally cast with the one end of each of the steering wheel spokes 3 made of steel. The other ends of the steering wheel spokes are joined to the steering wheel ring 4 made from steel tubing by couplings 5 made of pressure-cast aluminum. The steering wheel ring 4, the steering wheel spokes 3 and the couplings 5 joined to them are embedded in a jacket of polyurethane integral foam. The steering wheel hub 2, which has an axial through-bore, 7 is fastened by a weld 9 to the steering wheel spindle 8 made from a tube. On the steering wheel hub 2 there is mounted a pot-shaped gas bag container 11 provided with an opening 10 made in its bottom which aligns with the bore in the steering wheel hub 2. The gas bag 12 is folded into the gas bag container 11 such that its gas inlet 13 is in line with the opening 10 in the gas bag container 11. The marginal areas situated one over the other, which adjoin the opening 10 of the gas bag container 11 and the gas inlet 13 in the gas bag, are clamped together gas-tight by a flange 14 which is clamped by screws 15 to the steering wheel hub 2. The margin of the gas bag container 11 has an outwardly bent clip strip 16 by which the cap-like covering 17 formed from polyurethane integral foam is held in place. In the steering spindle 8 a tubular gas generator 18 with radial gas outlet openings 19 is fastened such that, between the periphery of the steering spindle 8 and the periphery of the gas generator 18 a gap 20 of cylindrical shape is present, through which the gas issuing from the gas outlet openings 19 can enter into the gap 20. In the direction of travel the steering spindle 8 is sealed gas-tight by the wall 21 in which the bottom of the gas generator 18 is fastened. The steering wheel can also be screwed or clamped to the steering spindle.

I claim:

1. In a gas bag collision safety system for the steering wheel of street vehicles, especially passenger automobiles, consisting of the tubular steering spindle (8) joined to the steering gear, and the bowl-shaped steering wheel (1) keyed or affixed to the steering wheel hub (2), with an integrated gas bag folded between the steering wheel ring (4) and the steering wheel hub, the marginal area around the gas inlet opening thereof being joined gas-tight to the steering wheel hub, the improvement wherein the gas inlet opening (13) of the gas bag (12) is made concentric with a through-bore (7) created in the steering wheel hub (2) and a gas generator (18) is disposed in the steering spindle (8).

2. A gas bag collision safety system according to claim 1, wherein the gas generator (18) has radial gas discharge openings (19) and a gap of circular cross section (20) is present between the periphery of the steering spindle (8) and the periphery of the gas generator (18).

3. A gas bag collision safety system according to claim 1, wherein the cover of the gas generator (18) at the steering wheel end is provided with axial gas discharge openings.

4. A gas bag collision safety system according claim 1, wherein the gas generator (18) is disposed between the steering wheel hub (2) and a wall (21) sealing the steering spindle (8) gas-tight in the direction of travel.

5. A gas bag collision safety system according claim 1, wherein between the steering wheel hub (2) and the steering spindle (8) a welded, threaded or compression junction exists.

6. A gas bag collision safety system according to claim 2, wherein the cover of the of the gas generator (18) at the steering wheel end is provided with axial gas discharge openings, the gas generator (18) is disposed between the steering wheel hub (2) and a wall (21) sealing the steering spindle (8) gas-tight in the direction of travel, and between the steering wheel hub (2) and the steering spindle (8) a welded, threaded or compression junction exists.

* * * * *